May 20, 1947.  H. C. NISSEN  2,420,995
CLUTCH MECHANISM
Filed July 20, 1944  2 Sheets-Sheet 1

Inventor
Henry C. Nissen
By William P. Stewart
Attorney

Witness:
Godfrey Pecina

May 20, 1947.   H. C. NISSEN   2,420,995
CLUTCH MECHANISM
Filed July 20, 1944   2 Sheets-Sheet 2
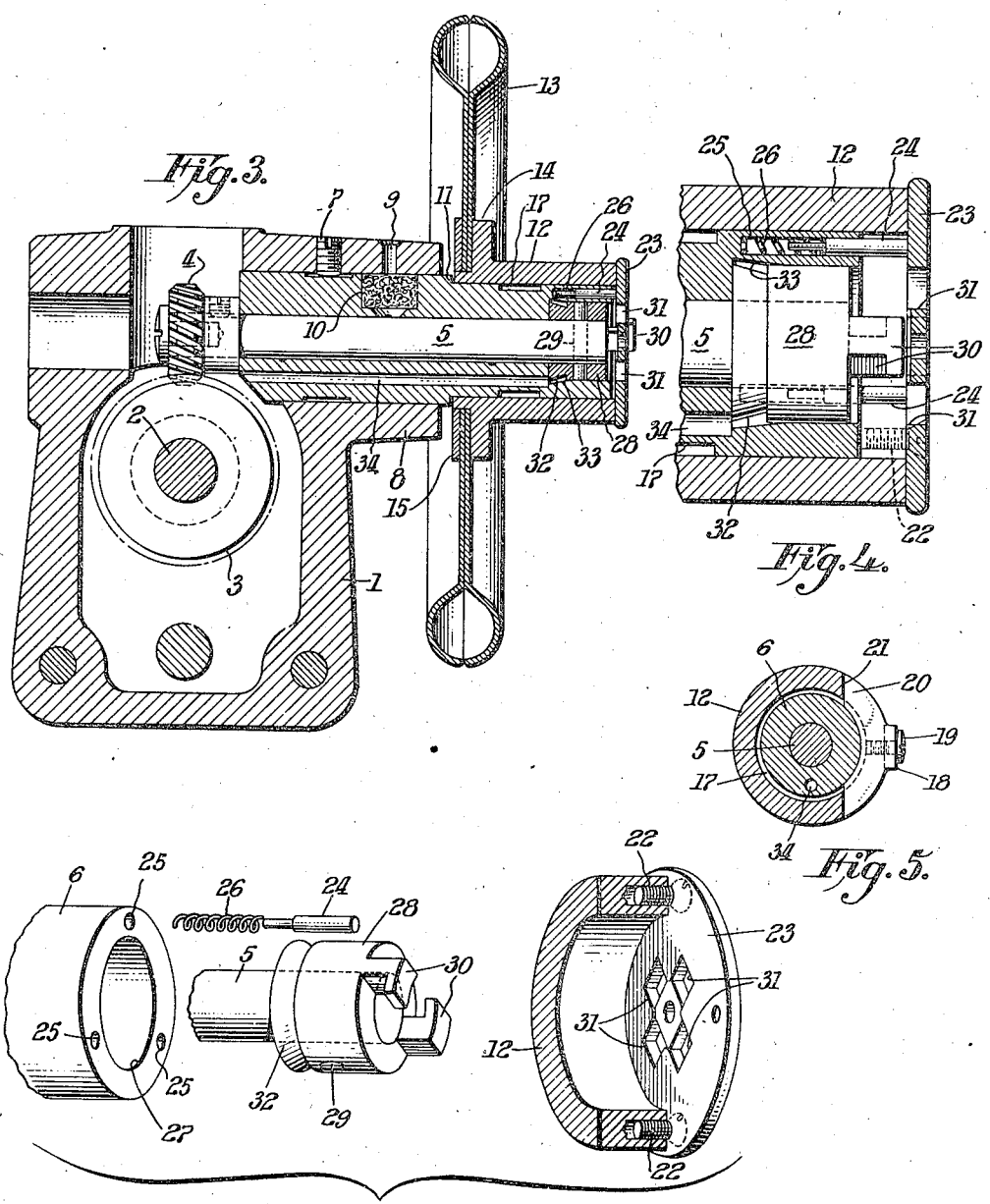
Inventor
Henry C. Nissen
By William P. Stewart
Attorney
Witness:
Godfrey Reina Patented May 20, 1947

2,420,995

UNITED STATES PATENT OFFICE 2,420,995

CLUTCH MECHANISM

Henry C. Nissen, Stratford, Conn., assignor to The Singer Manufacturing Company, Elizabeth, N. J., a corporation of New Jersey Application July 20, 1944, Serial No. 545,751

5 Claims. (Cl. 74—407)

1

The invention relates to a clutch mechanism of a kind adapted to be manually engaged or coupled and to be automatically disengaged or uncoupled, and of particular utility in its application to sewing machines.

As is well-known, it is necessary for a sewing machine operator from time to time to effect a manual adjustment of the position of the needle, as for example, to raise it to permit the shifting or the removal of the material being sewn. In many machines, such as the familiar domestic types, this adjustment is conveniently effected by manual rotation of the balance wheel; but in other types of machines, due in some instances to the position in which the machine is mounted and in other instances to the length of the overhanging bracket arm of the machine, the balance wheel is not within convenient reach of the operator's station adjacent the stitching mechanism. In such cases an auxiliary wheel may be provided and so located as to be within easy reach of the operator to permit manual movement of the needle as required.

The clutch mechanism of the present invention provides a simple and highly effective mechanism whereby such an auxiliary wheel, or handwheel as it is hereinafter termed, may be coupled to and uncoupled from the main drive shaft of the machine with convenience and safety and with a minimum of manipulation by the operator.

The features of the invention will be best understood from the following description of the preferred form illustrated in the accompanying drawings, of which:

Fig. 3 is a vertical section on the line 3—3 of Fig. 1;

Fig. 4 is an enlarged fragmentary sectional view illustrating a different position of the clutch elements from that shown in Fig. 3;

Fig. 5 is a section on the line 5—5 of Fig. 2;

Fig. 6 is an exploded view of the major elements of the mechanism.

Referring in detail to the drawings, a broken out portion of a sewing machine bracket-arm is shown, generally designated 1. This is the arm which overhangs the bed-plate of the machine, and for purposes of illustration of this particular application can be assumed to be of such length that the usual balance wheel is out of reach or

Figure 2:
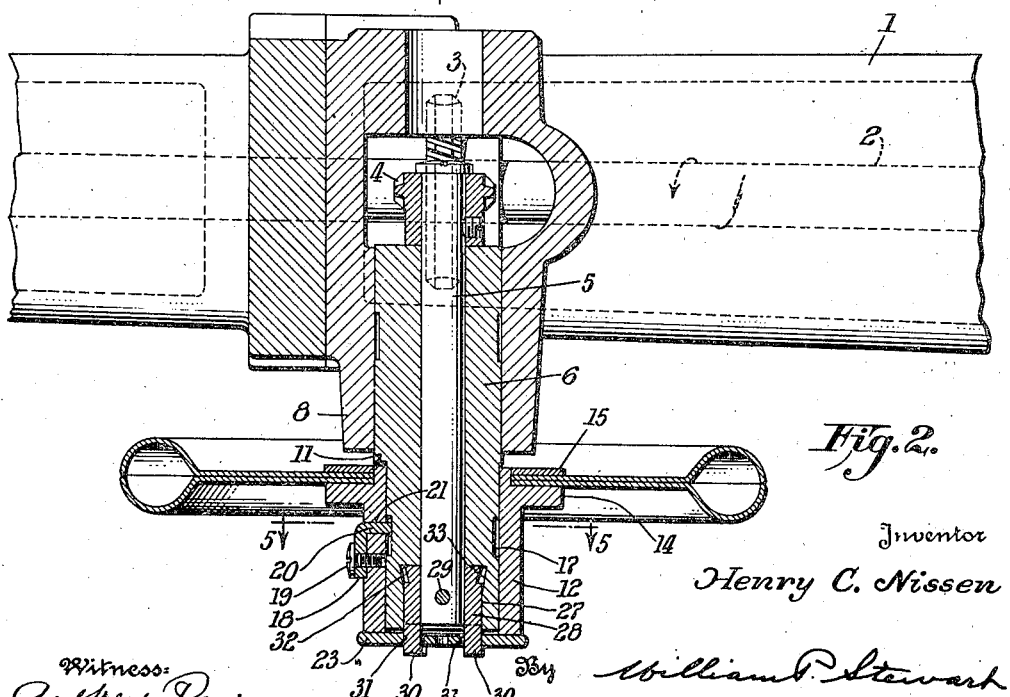
Fig. 2 is a horizontal section on the line 2—2 of Fig. 1.

2 out of convenient reach of the operator. The operator's station can be assumed to be at or adjacent the illustrated portion of the arm 1. Within the bracket-arm is indicated the arm shaft 2 which is power driven (in the direction indicated by the arrow, Fig. 2) to effect the reciprocation of the needle (not shown) in the usual manner.

Mounted on and secured to the arm shaft 2 is a spiral gear 3, and meshing with the latter is a spiral gear 4 secured to the end of a cross-shaft 5. The cross-shaft is journaled in a bushing 6 which is secured by screw 7 in a boss 8 integral with and extending forwardly from the bracket-arm 1. An oil hole 9 leads to the reservoir 10 from which the cross-shaft is lubricated.

Figure 1:
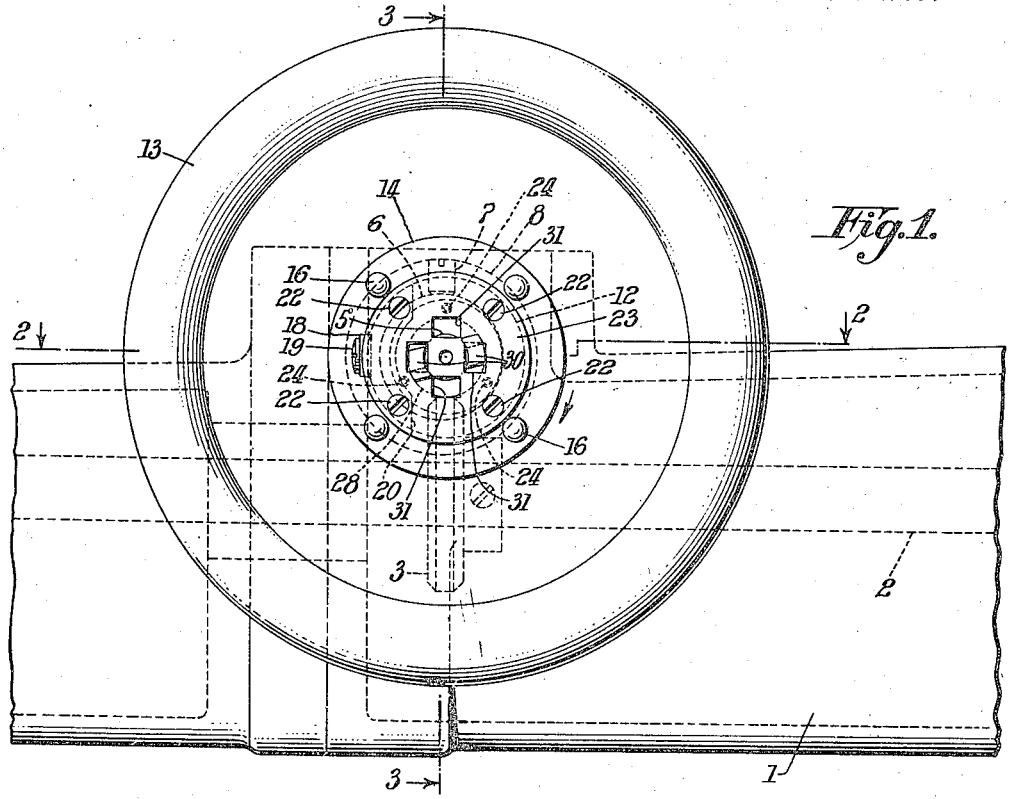
Fig. 1 is a front elevation of a portion of the overhanging bracket arm of a sewing machine with the clutch mechanism mounted thereon.

Outwardly from the shoulder 11, the bushing 6 is of reduced diameter and on the reduced-diameter section of the bushing is mounted the extended hub 12 of a hand-wheel 13. In the form illustrated, the hand-wheel comprises a pair of similar stampings which are united and secured to the hub flange 14 by a clamping plate 15 and rivets 16 (Fig. 1). The hand-wheel is mounted with freedom to rotate on the bushing 6 and also to move axially upon it. Its outward axial movement is limited by the length of the circumferential groove 17 in the bushing 6; a segmental stop-piece 18 being secured to the hub 12 by screw 19 having an inturned flange 20 which passes through a hole 21 in the hub and freely enters the groove 17.

Secured to the outer end of the hub 12 by screws 22 is a perforated plate 23, which constitutes one of the clutch elements. Engaging the inner face of the plate 23 are a plurality of shouldered thrust-pins 24 mounted in locating holes 25 in the annular end face of bushing 6 and urged outwardly by springs 26. By this means, the hand-wheel and hub assembly are normally maintained at the outer limit of their permitted movement along bushing 6. This is the position illustrated in Fig. 4. The inward movement of the hand-wheel and hub assembly may be limited by the stop-piece 18 or by the engagement of the hub 12 with the bushing shoulder 11.

In the outer end of the bushing 6 is a counterbore or cavity 27 in which is mounted the other clutch element. This element comprises a cylindrical body portion 28 which is secured to the outer end of cross-shaft 5 by a pin 29; and from the end face of the body portion 28 project two bayonet lugs 30, the heads of which are spaced and dimensioned to enter either of diametrically opposite pairs of holes 31 in the plate 23.

At the inner end of the clutch body portion 28, is a short flared section 32, the periphery of which is spaced from the adjacent and slightly tapered wall 33 of the counterbore 27; and extending throughout the length of the bushing 6 is a duct 34 the outer end of which terminates adjacent the flared section 32. The opposite end of the duct 34 opens into the interior of the bracket-arm 1 immediately above the spiral gear 3. By this means oil seeping outwardly along the cross-shaft 5 and outwardly of the inner face of the flared section 32 is directed into the duct 34 and back onto the spiral gear 3.

When the machine is running, the cross-shaft is driven by the arm-shaft through spiral gears 3 and 4. As will be understood, the hand-wheel is in its outer or Fig. 4 position at this time and, being out of contact with any driven part, remains stationary.

When the machine is brought to rest and it is desired to rotate the arm-shaft manually, as for the purpose of raising the needle of the machine, the hand-wheel is manually moved inwardly axially of the cross-shaft 5 and rotationally about the bushing to pass the bayonet lugs 30 through a pair of the holes 31 and to interlock the plate 23 beneath the overhanging portions of the lugs. The interlocking is effected by rotation of the hand-wheel in the direction of the arrow in Fig. 1. Continued rotation of the hand-wheel in the same direction rotates the cross-shaft, and, through the spiral gears, the arm-shaft 2, the latter being rotated forwardly, or in the same direction in which it is power driven, i. e., in the direction of the arrow in Fig. 2.

As a result of the bayonet type of interlock effected by the clutch elements, the hand-wheel remains clutched to the cross-shaft even when the hand-wheel is released. Thus the operator's hand is freed to manipulate the material being sewn as soon as the clutch has been engaged as described; and, if necessary, further manual operation of the arm-shaft can be effected by mere rotation of the hand-wheel.

A further important advantage of this type of clutch mechanism is that no attention is required of the operator in order to disengage or uncouple the hand-wheel from the cross-shaft. This is achieved automatically. As soon as power is again applied to the arm-shaft, the cross-shaft is rotated by it and in the direction of the arrow of Fig. 1, i. e., in the same direction in which the hand-wheel was rotated to interlock the clutch members. The inertia of the hand-wheel, which is relatively heavy, is such that upon such rotation of the cross-shaft the overhanging portions of the bayonet lugs are drawn off the portions of the plate 23 with which they were previously engaged; and, as soon as such portions clear the edges of the holes 31, the springs 26, which were compressed in the engagement of the clutch, are free to expand and force the thrust-pins 24, plate 23 and hand-wheel-hub assembly outwardly to the position of complete disengagement from the clutch elements.

Thus, when the clutch has been engaged and the arm-shaft manually rotated as desired, the operator may proceed immediately as the work in hand may require and without further thought to the condition of the clutch. If further manual rotation of the arm-shaft is in order, it requires only the further rotation of the hand-wheel; if not, and the sewing operation is to be resumed, the operator merely starts the machine in the usual manner, the clutch disengaging itself as above described.

Having thus set forth the nature of the invention, what I claim herein is:

1. In a mechanism of the character described, the combination of a power-driven shaft element, a hand-wheel element mounted with freedom for movement relatively to the shaft element both rotationally and axially thereof, a perforated clutch-plate associated with one of said elements for rotation therewith, bayonet-lock means associated with the other element for rotation therewith and adapted to interlock with the perforations of the clutch-plate in response to axial and rotational movement of the hand-wheel element relatively to the shaft element, the inertia of the hand-wheel element being such as to disengage said interlock in response to rotation of the shaft element.

2. In a mechanism of the character described, the combination of a power-driven shaft element, a hand-wheel element mounted with freedom for movement relatively to the shaft element both rotationally and axially thereof, a perforated clutch-plate associated with one of said elements for rotation therewith, bayonet-lock means associated with the other element for rotation therewith and adapted to interlock with the perforations of the clutch-plate in response to axial and rotational movement of the hand-wheel element relatively to the shaft element, and means responsive to rotation of the shaft element to disengage said interlock.

3. In a mechanism of the character described, the combination of a power-driven shaft element, a hand-wheel element mounted with freedom for movement relatively to the shaft element both rotationally and axially thereof, a perforated clutch-plate associated with one of said elements for rotation therewith, bayonet-lock means associated with the other element for rotation therewith and adapted to interlock with the perforations of the clutch-plate in response to axial and rotational movement of the hand-wheel element relatively to the shaft element, the inertia of the hand-wheel element being such as to disengage said interlock in response to rotation of the shaft element, and spring means adapted to effect relative axial movement of said hand-wheel and shaft elements upon disengagement of the said interlock.

4. The combination with a power driven shaft and an axially movable hand-wheel for manually rotating the shaft, of means for coupling and maintaining said shaft and hand-wheel in driving relationship including bayonet-lock members adapted to be interlocked in response to manual movement of the hand-wheel in one direction along and about its axis of rotation, the inertia of the hand-wheel being such as to release the bayonet interlock in response to power rotation of the shaft, and spring means for moving the released hand-wheel in an opposite direction along its axis of rotation.

5. In a mechanism of the character described, in combination, a power-driven rotary shaft provided at one end thereof with a bayonet-lug, a bearing for said shaft, a hand-operated element having a hub journaled upon said bearing for rotation and axial movement relatively to said shaft, an apertured plate carried by said hand-operated element and complemental to said bayonet-lug for locking said hand-operated element against movement axially of said shaft, and spring means biasing said hand-operated element toward a position wherein said bayonet-lug and said plate are disengaged.

HENRY C. NISSEN.

REFERENCES CITED

The following references are of record in the file of this patent:

UNITED STATES PATENTS

| Number | Name | Date |
|---|---|---|
| 1,285,065 | Davis | Nov. 19, 1918 |
| 1,271,476 | Koehl | July 2, 1918 |
| 2,327,980 | Bryant | Aug. 31, 1943 |
| 1,498,300 | Ryder | June 17, 1924 |
| 1,414,233 | Thornycroft | Apr. 25, 1922 |
| 1,338,668 | Balsam | May 4, 1920 |